(12) United States Patent
Sun et al.

(10) Patent No.: US 10,203,452 B2
(45) Date of Patent: Feb. 12, 2019

(54) WIDE-ANGLE, ALIASING-FREE BEAM STEERING USING APERIODIC EMITTER ARRAYS

(71) Applicant: Intel Corporation, Santa Clara, CA (US)

(72) Inventors: Jie Sun, Mountain View, CA (US); Haisheng Rong, Pleasanton, CA (US); Jonathan K. Doylend, Morgan Hill, CA (US)

(73) Assignee: Intel Corporation, Santa Clara, CA (US)

( * ) Notice: Subject to any disclaimer, the term of this patent is extended or adjusted under 35 U.S.C. 154(b) by 85 days.

(21) Appl. No.: 15/395,874

(22) Filed: Dec. 30, 2016

(65) Prior Publication Data

US 2018/0188452 A1   Jul. 5, 2018

(51) Int. Cl.
| | | |
|---|---|---|
| *G02B 6/12* | (2006.01) | |
| *G01S 17/10* | (2006.01) | |
| *G01S 17/42* | (2006.01) | |
| *G01S 17/89* | (2006.01) | |
| *G01S 7/481* | (2006.01) | |
| *G02B 6/34* | (2006.01) | |

(52) U.S. Cl.
CPC ........ *G02B 6/12019* (2013.01); *G01S 7/4815* (2013.01); *G01S 7/4816* (2013.01); *G01S 7/4817* (2013.01); *G01S 17/10* (2013.01); *G01S 17/42* (2013.01); *G01S 17/89* (2013.01); *G02B 6/34* (2013.01); *G02B 2006/12107* (2013.01)

(58) Field of Classification Search
None
See application file for complete search history.

(56) References Cited

U.S. PATENT DOCUMENTS

| | | |
|---|---|---|
| 6,232,920 B1 | 5/2001 | Brookner et al. |
| 8,164,531 B2 | 4/2012 | Lier |
| 9,395,727 B1 | 7/2016 | Smith et al. |
| 9,575,341 B2 | 2/2017 | Heck et al. |
| 9,823,118 B2 | 11/2017 | Doylend et al. |
| 2005/0195103 A1 | 9/2005 | Davis et al. |

(Continued)

FOREIGN PATENT DOCUMENTS

WO   2007063298 A1   6/2007

OTHER PUBLICATIONS

Ami Yaacobi, et al, "Integrated phased array for wide-angle beam steering", Aug. 1, 2014, vol. 39, No. 15, Optics Letters, 4 pages.

(Continued)

*Primary Examiner* — Chad H Smith
(74) *Attorney, Agent, or Firm* — Compass IP Law PC

(57) ABSTRACT

A transmission circuit includes an array of subarrays of emitters with quasi-periodic spacing. A first subarray of emitters emits a source signal, and a second subarray of emitters emits the source signal. The first and second subarrays are separated by a subarray spacing that quasi-periodic, wherein the spacing between different subarrays is different. The quasi-periodic subarray spacing is to cause constructive interference of a main lobe of the emissions from the subarrays, and to cause non-constructive interference of sidelobes of the emissions. The spacing between emitters in the subarrays can vary from one subarray to another.

20 Claims, 9 Drawing Sheets

(56) References Cited

U.S. PATENT DOCUMENTS

2011/0298676 A1* 12/2011 Yanagihara ............ H01Q 21/06
343/711
2014/0192394 A1* 7/2014 Sun ......................... G02B 6/26
359/289

OTHER PUBLICATIONS

International Search Report and Written Opinion for PCT Patent Application No. PCT/US2017/061622, dated Feb. 5, 2018, 12 pages.
J.C. Hulme, et al, "Fully Integrated Hybrid Silicon Two Dimensional Beam Scanner", Mar. 9, 2015 | vol. 23, No. 5, Optics Express, 14 pages.
J.K. Doylend, et al., "Two-dimensional free-space beam steering with an optical phased array on silicon-on-insulator." Dept. of Electrical and Computer Engineering, University of California, Santa Barbara, California 93106, USA, Oct. 24, 2011 / vol. 19, No. 22/ Optics Express, 10 pages.
Karel Van Acoleyen, et al, "Two-Dimensional Optical Phased Array Antenna on Silicon-On-Insulator", Jun. 21, 2010 / vol. 18, No. 13 / Optics Express, 6 pages.
Neil Savage, "Phased-Array Antennas for Light", http://spectrum.ieee.org, Jan. 9, 2013, 2 pages.
Philip E. Ross, "Lidar-on-a-Chip: Scan Quickly, Scan Cheap", http://spectrum.ieee.org, May 27, 2015, 1 page.

* cited by examiner

WIDE-ANGLE, ALIASING-FREE BEAM STEERING USING APERIODIC EMITTER ARRAYS

FIELD

Descriptions herein are generally related to wireless emitters, and more particular descriptions are directed to non-mechanical beam steering for emitter arrays.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright © 2016, Intel Corporation, All Rights Reserved.

BACKGROUND

LIDAR (light detection and ranging) systems involve emitting light and processing reflections of the light for applications such as laser-based remote sensing, image mapping, free-space optical communications, and other applications. For LIDAR to work, the source light or laser beam is steered to sweep across the target object or scene. Traditional laser beam steering system involved mechanical systems, which were large, expensive, and prone to failure. More recent systems include optical phased array (OPA) integrated circuit (I/C) chips, which have emerged as an alternative to traditional mechanical beamsteering devices such as spinning mirrors.

FIG. 1 is a representation of a prior art antenna system with equally spaced antennas. An OPA such as system 100 is traditionally composed of an array of periodically placed optical antennas. System 100 can steer an optical beam electronically without any mechanically moving parts, but has a very limited beam steering angle. In most cases the angle maxes out below 20 degrees. The limitation on the beam steering angle in the conventional OPA of system 100 is due to antennas 102 being placed periodically with a uniform spacing 'a' across the entire array. In such a periodic phased array, the emitted optical beam has aliasing beams, also referred to as grating lobes. The aliasing beams refer to a repetition of the beam signal energy every few degrees.

FIG. 2 is a diagrammatic representation of a prior art beam output of the antenna system of FIG. 1, with a main beam and several aliasing signals of similar energy. Diagram 200 represents the angular separation $\Delta\theta$ or difference in angle between the main beam and the nearest aliasing on its side. The angular separation can be given by the following equation:

$$\sin(\Delta\theta) = \frac{\lambda}{a}$$

In the equation, $\lambda$ represents the operating wavelength of the optical phased array. When the beam is steered by the phased array, both the main beam and the aliasing beams move together, creating ambiguity when the beam is steered by more than $\Delta\theta$. As such, in the presence of the beam aliasing, the angular steering range is limited to $<\Delta\theta$. Since the antenna spacing (a) is typically much larger than the optical wavelength, which is typically on the order of 1 μm or micron, the available steering angle $\Delta\theta$ is usually limited to below 20 degrees. It is possible to increase the steering angle by shrinking the antenna spacing (for example, a system with a=1.3$\lambda$ increased from below 20 degrees to approximately 50 degrees). However, there are practical limits on how small the antenna spacing can be shrunk, since providing high precision sub-wavelength antenna spacing may not be possible. Additionally, shrinking the antenna spacing results in an enlarged beam width, which significantly reduces spatial resolution.

Additionally, beam aliasing can be suppressed to some extent by randomly placing antennas, but such a design is impractical for a significant number of antennas due to the large amount of area needed to provide random spacing. Additionally, computing random spacing of antennas becomes computationally intensive when trying to reduce aliasing signal energy.

In diagram 200, the dashed line represents an envelope corresponding to the beam profile of a single emitter, illustrating the angular intensity distribution of a periodic phased array with many aliasing beams. The distribution of diagram 200 plots angle 202 against normalized beam intensity 204. Diagram 200 represents a curve for a Gaussian-shaped emitter design with 150-nm near-field Full-Width-Half-Maximum (FWHM). Main beam 210 represents the desired output signal, and aliasing 220 represents the repeated signal. It will be understood that many aliasing signals have significant amounts of energy relative to main beam 210, which reduces the resolution.

Thus, traditionally there is a tradeoff between resolution and beamsteering angle for solid state LIDAR systems. Furthermore, traditionally antenna design generates significant aliasing.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, and/or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Descriptions of certain details and implementations follow, including a description of the figures, which may depict some or all of the embodiments described below, as well as discussing other potential embodiments or implementations of the inventive concepts presented herein.

DETAILED DESCRIPTION

As described herein, a transmission circuit includes multiple emitter subarrays, where the subarrays are not periodically spaced or quasi-periodically spaced. The subarrays can be non-uniformly spaced to improve constructive interference of a main lobe or main beam, and can increase non-constructive interference of sidelobes. Thus, the relative intensity of the main lobe to the sidelobes can be increased with more subarrays, improving resolution. In one embodiment, with aliasing reduction, an optical beam can be steered nearly the entire 180 degree field with a solid state LIDAR (light detection and ranging). The quasi-periodic spacing and improved aliasing can apply to signals of different kinds, or signals of different wavelengths other than those in the category of light, such as microwave, radio frequency (RF), or infrared.

In general, a first subarray of emitters emits a source signal, and a second subarray of emitters emits the source signal. The first and second subarrays are separated by a subarray spacing that is aperiodic relative to a wavelength of the signal and relative to other subarrays. In one embodiment, the spacing between emitters in the subarrays can vary from one subarray to another, and be periodic within the subarray. Thus, emitters of a first subarray can have a first period and emitters of a second subarray can have a second period different from the first period. In one embodiment, a system can include an OPA (optical phased array), where the antennas are placed quasi-periodically with antenna spacings that cause the optical beam steering range to approach the theoretical limit of 180 degrees. One particular understanding of quasi-periodic can refer to aperiodic spacing between subarrays and periodic spacing of emitters within a given subarray.

Figure 1:
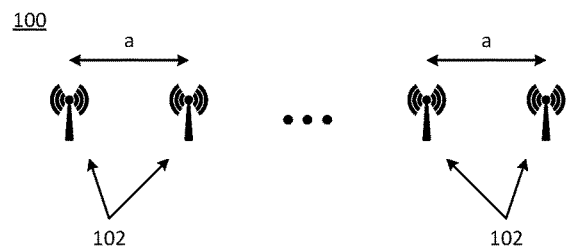
FIG. 1 is a representation of a prior art antenna system with equally spaced antennas.
Figure 2:
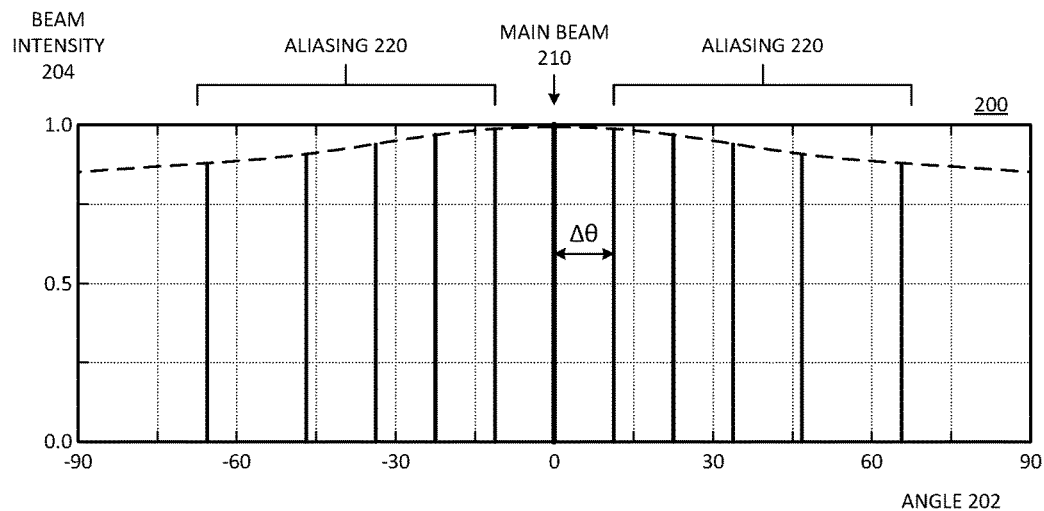
FIG. 2 is a diagrammatic representation of a prior art beam output of the antenna system of FIG. 1, with a main beam and several aliasing signals of similar energy.
Figure 3:
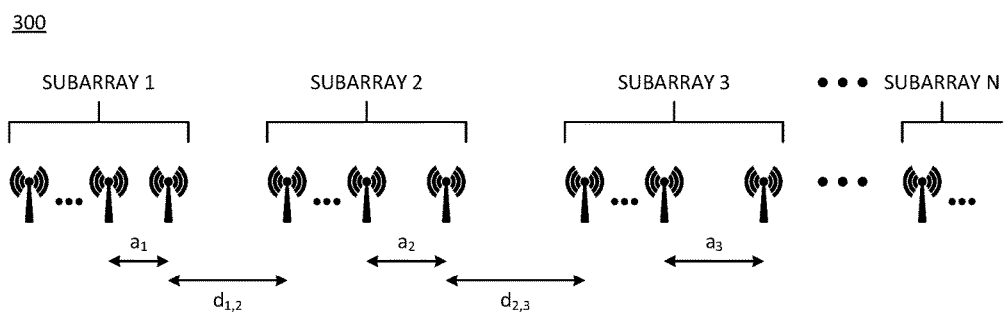
FIG. 3 is a representation of an embodiment of an antenna system with quasi-periodic spacing.

FIG. 3 is a representation of an embodiment of an antenna system with quasi-periodic spacing. System 300 provides one example of an array of antennas with non-periodic spacing. As will be better understood from the discussion below, the SNR (signal to noise ratio) or desired signal isolation can be improved with more subarrays of antennas, but what is described in system 300 should be understood generally to apply to any number N of multiple subarrays. In one embodiment, the spacing between subarrays provides constructive interference of a main lobe between subarrays without constructive interference of the sidelobes. In one embodiment, the different spacings between antennas within subarrays provides constructive interference of a main lobe between subarrays without constructive interference of the sidelobes. In one embodiment, both the spacing between subarrays and the spacing of antennas within subarrays provide constructive interference of a main lobe between subarrays without constructive interference of the sidelobes.

System 300 represents a concatenation of N subarrays of antennas. In one embodiment, the spacing between antennas within subarrays is periodic or consistent from one antenna to the next. The spacing between subarrays is aperiodic or different from one subarray to the next. The spacing in system 300 could be referred to as quasi-periodic because of the combination of periodic antenna spacing within a subarray with aperiodic subarray spacing. It will be understood that the subarrays have aperiodic or non-periodic spacing between them, even though the antennas within a subarray may have period spacing between them. Reference to quasi-periodic spacing throughout should be generally understood as referring to differences in spacing from one subarray to another.

In one embodiment, each subarray[1:N] has periodic spacing for its antennas. For example, subarray 1 has multiple antennas with spacing of $a_1$. In one embodiment, within subarray 1, the distance from any one antenna to any other antenna is a multiple of $a_1$. The spacing between antennas for subarray 2 is illustrated as $a_2$, which is different from $a_1$. The spacing between antennas for subarray 3 is illustrated as $a_3$, which is different than either $a_1$ or $a_2$. In one embodiment, the spacing between antennas within a subarray is the same for various subarrays. For example, consider an implementation where $a_2=a_1$, or where $a_3=a_1$. Thus, in one embodiment, multiple subarrays can include the same antenna spacing. Typically at least two subarrays will have different antenna spacing. Thus, multiple or all subarrays have a distinctive period $a_i$ different from other subarrays.

As shown in system 300, the subarrays have subarray spacing $d_{j,k}$ between the subarrays. For example, the distance from subarray 1 to subarray 2 is $d_{1,2}$, and the distance from subarray 2 to subarray 3 is $d_{2,3}$, where $d_{1,2}$ is different from $d_{2,3}$. Similar to the antenna spacing within subarrays, in one embodiment, at least two subarrays can share the same subarray spacing, where at least two subarrays having different spacing. Thus, for example, it is possible to implement system 300 in different physical implementations such as physically splitting subarrays into different physical portions that otherwise have the same transmission characteristics. The overall system includes at least two different spacings to provide constructive interference of main beams while not constructively interfering with at least certain sidelobes to produce a higher resolution beam by reducing aliasing effects.

In one embodiment, a system designer can select the periods $a_i$ of the subarrays and the spacing $d_{j,k}$ between adjacent subarrays to suppress the grating lobes and reduce or eliminate the aliasing effect in the whole 180-degree steering range. In one embodiment, the periods or antenna spacings $a_i$ increase along a signal propagation path, as the path extends further from the signal source. In one embodiment, the subarray spacings $d_{j,k}$ increase along a signal propagation path, as the path extends further from the signal source. In one embodiment, both the antenna spacing and the subarray spacing increase along the signal propagation path. In one embodiment, the subarray spacing is greater than any of the antenna spacings. Thus, for example, the smallest subarray spacing can be greater than the largest antenna spacing.

Figure 4:
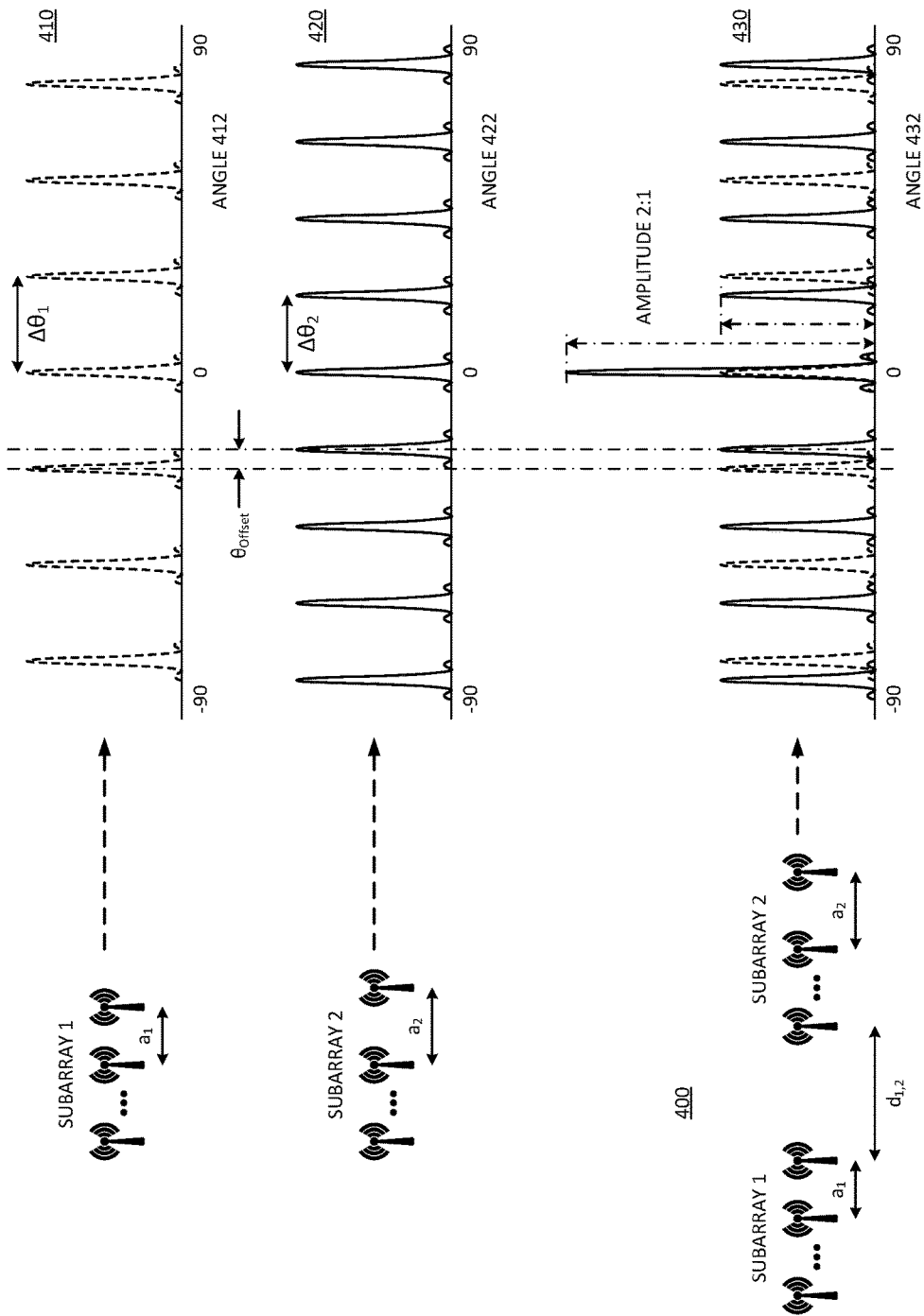
FIG. 4 is a diagrammatic representation of an embodiment of an antenna system with quasi-periodic spacing to cause constructive interference of a main beam, and non-constructive interference of sidelobes.

FIG. 4 is a diagrammatic representation of an embodiment of an antenna system with quasi-periodic spacing to cause constructive interference of a main beam, and non-constructive interference of sidelobes. System 400 includes subarray 1 and subarray 2, and system 400 provides an example of a system in accordance with system 300 of FIG. 3. For simplicity, system 400 includes only two subarrays for purposes of illustration. Diagram 430 illustrates an emitted beam profile for system 400.

Diagram 410 illustrates an emitted beam profile for only subarray 1. Subarray 1 includes antenna spacing or period of $a_1$, and emits a main beam at 0 degrees along with multiple aliasing beams. The angular separation between the aliasing beams for subarray 1 is $\Delta\theta_1$. Diagram 420 illustrates an emitted beam profile for only subarray 2. Subarray 2 includes antenna spacing or period $a_2$, and emits a main beam at 0 degrees along with multiple aliasing beams. The angular separation between the aliasing beams for subarray 2 is $\Delta\theta_2$.

When subarrays 1 and 2 are concatenated to form a single array as illustrated by system 400, the resulting beam profile as illustrated in diagram 430 is the sum of the beam profiles of the two subarrays. It will be observed that because the angular separation of the aliasing beams of subarray 1 is not the same as the angular separation of the aliasing beams of subarray 2, or $\Delta\theta_1 \neq \Delta\theta_2$, only the main beams at $\theta=0$ degrees are aligned and constructively add. As a result, the concatenated array only enhances the main beam but not the aliasing beams. By concatenating two subarrays, the main beam to aliasing beam has a ratio of 2:1. With a ratio of 2 to 1 on the amplitude, the suppression ratio (SR) in terms of intensity is 4:1 (the intensity changes as the square of the amplitude). While 2 subarrays are illustrated in system 400 for purposes of simple illustration, it will be understood that concatenating more subarrays will result in larger SR.

The subarray spacing between the subarrays is $d_{1,2}$. As illustrated in diagrams 410, 420, and 430, there is a difference or offset of $\theta_{offset}$. In one embodiment, the periods of the emitters or antenna elements of the subarrays, $a_i$, and the spacing between the subarrays, $d_{j,j+1}$, can be designed to constructively add only the main beams, while the aliasing beams experience suppression. One approach to identifying spacing parameters that will result in constructive interference of the main beams and not the aliasing beams is to compute a gradient descent algorithm. Other optimization computations could be performed.

Figure 5:
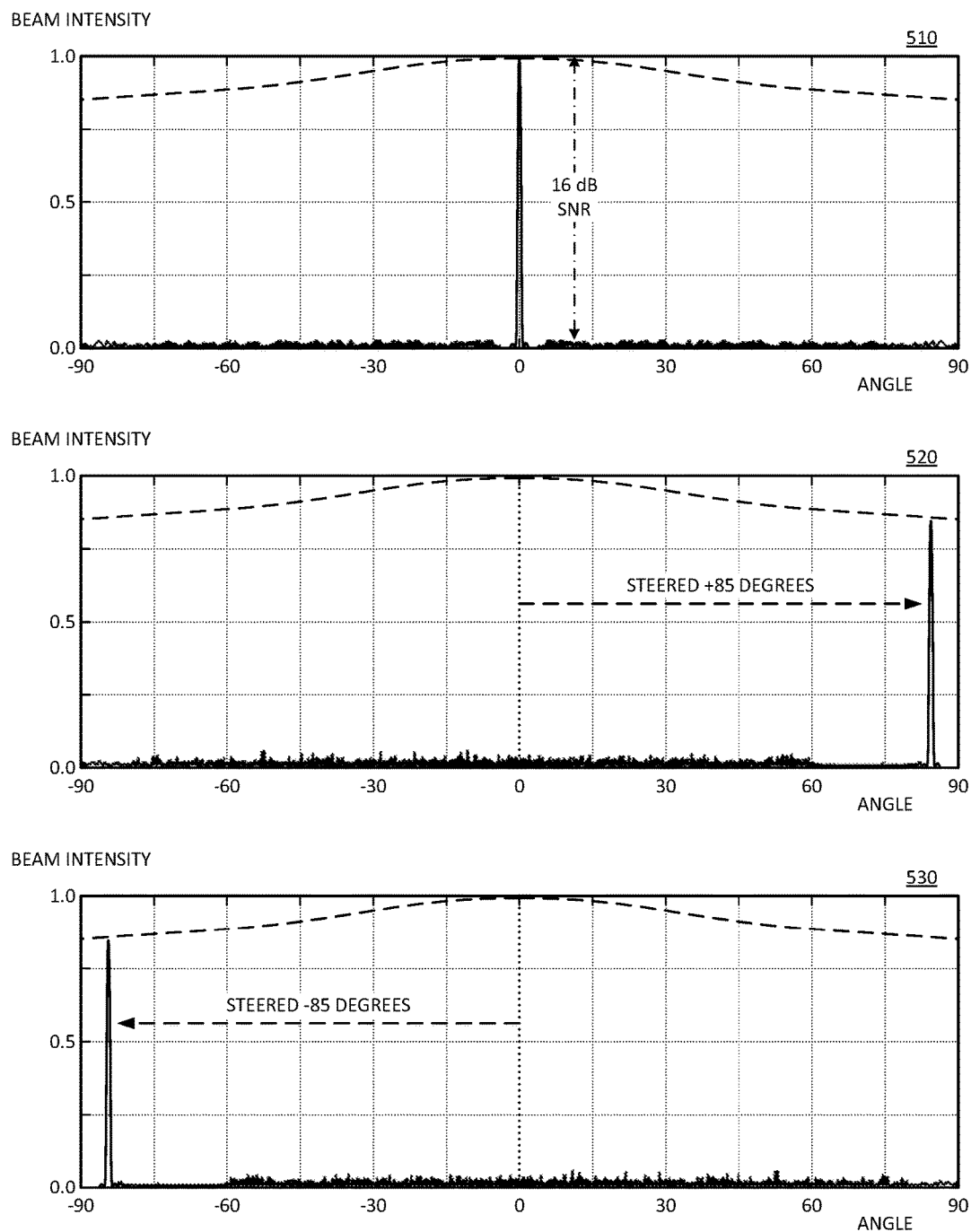
FIG. 5 is a diagrammatic representation of an embodiment of beamsteering with an antenna system with quasi-periodic spacing.

FIG. 5 is a diagrammatic representation of an embodiment of beamsteering with an antenna system with quasi-periodic spacing. Diagram 510 illustrates a plotting of beam intensity versus angle for a beam that is not steered. Diagram 520 illustrates a plotting of beam intensity versus angle for a beam steered approximately +85 degrees, and diagram 530 illustrates a plotting of beam intensity versus angle for a beam steered approximately −85 degrees. Diagrams 510, 520, and 530 refer to a specific system design example. The envelope represented by the dashed curve corresponds to the beam profile of a single emitter.

The example system from which diagrams 510, 520, and 530 are produced is an optical phased array system including 7 subarrays, each having 19 optical antennas. The antenna spacing in each subarray and the spacings between the subarrays were provided as follows:

| | Subarray | | | | | | |
|---|---|---|---|---|---|---|---|
| | 1 | 2 | 3 | 4 | 5 | 6 | 7 |
| Antenna spacing within subarray (um) | 5.24 | 5.60 | 5.96 | 6.34 | 6.76 | 7.20 | 7.66 |
| Antenna spacing between subarrays (um) | N/A | 10.9 | 12.48 | 12.76 | 13.30 | 14.0 | 14.24 |

With the parameters in the above table, the beam aliasing of an optical phased array is significantly suppressed, with a 16 dB suppression ratio or 16 dB SNR (signal to noise ratio), as illustrated in diagram 510. Furthermore, the quasi-periodic phased array can steer the optical beam to the left and right for a total of approximately 170 degrees total steering. Diagram 520 illustrates steering of the beam +85 degrees, and diagram 530 illustrates steering of the beam −85 degrees. Such a steering range is impossible to achieve using conventional periodic optical phased arrays.

Figure 6:
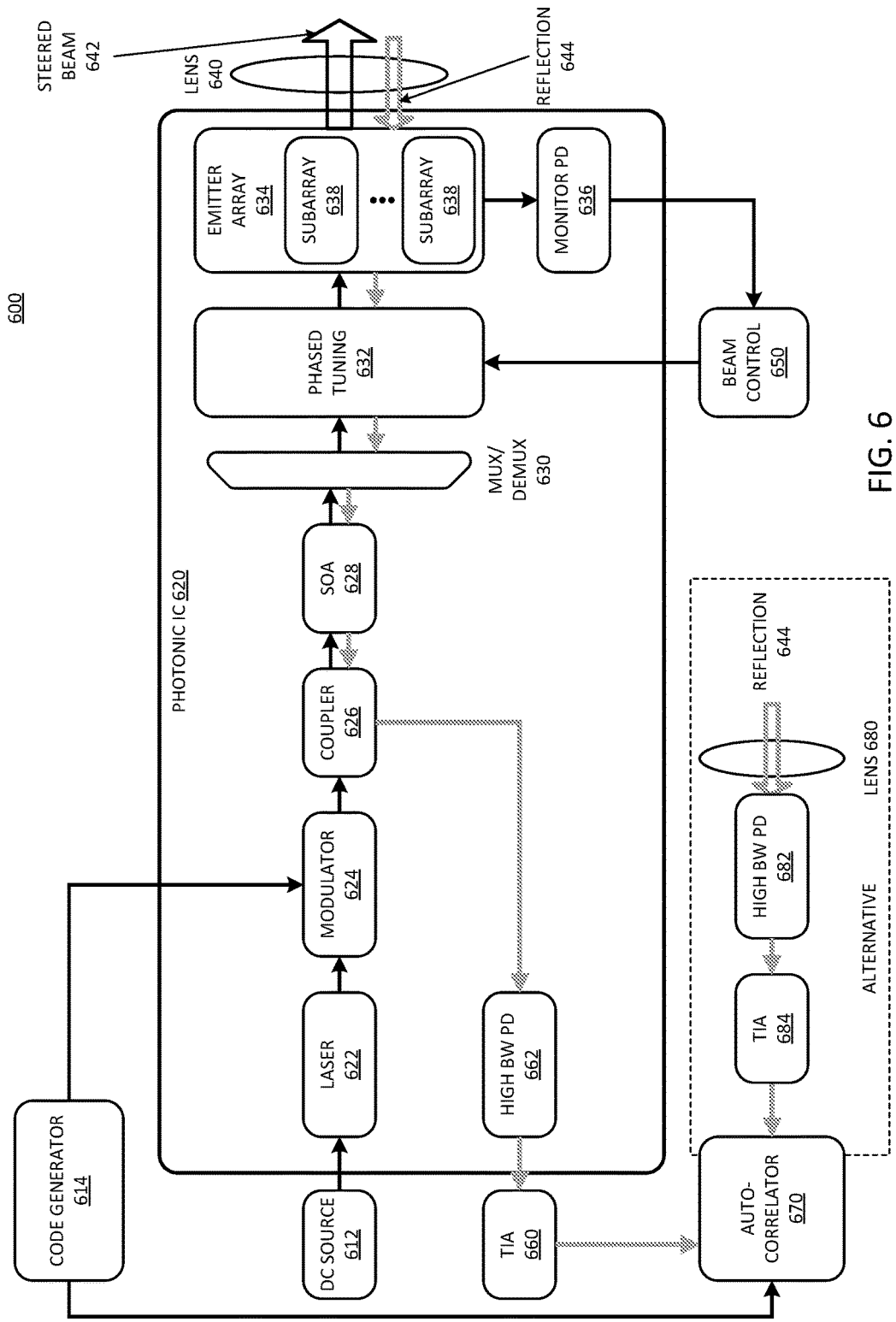
FIG. 6 is a block diagram of an embodiment of a photonic system with quasi-periodically-spaced emitter subarrays, which autocorrelates a reflection signal with a known bit sequence.

FIG. 6 is a block diagram of an embodiment of a photonic system with quasi-periodically-spaced emitter subarrays, which autocorrelates a reflection signal with a known bit sequence. System 600 illustrates one example of a photonic system with an emitter array in accordance with an embodiment of system 300. Photonic IC (integrated circuit) 620 integrates optical/photonic components that enable modulating a bit sequence onto a steerable beam to transmit to a target. In one embodiment, photonic IC 620 is a silicon photonics chip.

DC source 612 represents a power source for system 600. In particular, DC source 612 provides power to enable laser 622 to generate an optical signal or laser beam. In one embodiment, laser 622 includes a continuous-wave laser. In one embodiment, the modulation can be external modulation of a signal onto the laser which can enable the signal to be modulated independently of phase-steering. Alternatively, the laser can be pulsed to generate a bit pattern, in which case an external modulator may not be required. In one embodiment, the bit sequence modulation is performed via amplitude modulation. Thus, in one embodiment, modulator 624 represents an amplitude modulator or other modulator that inserts a data bit sequence onto the laser signal. Modulator 624 can be a high speed modulator, indicating that the bit sequence has a data rate at least 64 times higher than a rate at which the optical signal is switched from one pixel to the next as it is scattered off the target. In one embodiment, code generator 614 generates a PRBS (pseudorandom bit sequence) or other code or pattern for modulation onto the carrier frequency of the optical signal, which can enable correlation of an echo or reflection signal. In one embodiment, code generator 614 is part of a processor that interfaces with photonic IC 620.

Coupler 626 represents an optical component to convey the modulated optical signal to an amplifier component. SOA (semiconductor optical amplifier) 628 represents an optical component that amplifies the optical signal. SOA 628 amplifies the optical signal to split the signal into multiple waveguides. Mux/demux 630 represents a waveguide demultiplexer for transmitted signals. In one embodiment, mux/demux 630 can operate as a waveguide multiplexer for received signals. Mux/demux 630 could alternatively be referred to as a splitter/combiner. The optical signal is split into multiple different waveguides in phased array 632. In one embodiment, beam control 650 generates a phase offset among the multiple waveguides of phased waveguides of phase tuning component 632. Thus, beam control 650 can change the relative phase of the signals and electrically steer the output beam, instead of using mechanical means to steer the beam. In one embodiment, photonics IC 620 includes monitor PD (photodetector) 636 to tap off optical power to feed back into beam control 650, to enable beam control 650 to appropriately adjust the beamsteering operation of phase tuning 632. In one embodiment, beam control 650 is part of photonic IC 620.

Phase tuning 632 conveys the signals to one or more emitter portions of emitter array 634 for transmission from photonic IC 620. Phase tuning 632 is steerable based on control signals from beam control 650. In one embodiment, phase tuning 632 and output emitter array 634 are integrated on a single chip with modulator 624 to generate and steer a beam towards a target. Emitter array 634 includes optical emitters. Emitter array 634 includes multiple subarrays 638, which outputs steered beam 642 via lens 640 toward the target. With multiple subarrays 638, emitter array 634 can be in accordance with any embodiment of a phased array described herein that is applicable to an optical system, such as an optical implementation of system 300. Subarrays 638 are separated by non-periodic subarray spacing. In one embodiment, individual emitters within each subarray 638 are periodically spaced, but the period is different from one subarray to another.

In one embodiment, lens 640 is an adjustable lens, which can be focused differently to allow for wider or narrower transmission and reception. Wider transmission spreads the transmitted signal further. Wider reception enables focusing more reflected signals. Narrower transmission enables more focused transmission and can reduce scattering. Narrower reception reduces the amount of reflection light that might be received. In one embodiment, reflection signal 644 returns via lens 640 through the coupler of emitter array 634, and is conveyed back through the waveguides of phase tuning 632, via mux 630 to SOA 628, and to coupler 626. In one embodiment, coupler 626 can couple a transmitted signal from modulator 624 to SOA 628, and can couple a received signal from SOA 628 to high bandwidth photodetector 662. In one embodiment, photodetector 662 is a high-bandwidth photodiode that receives the reflected signal for detection. In one embodiment photodetector 662 is integrated on-chip on photonics IC 620 with phase tuning 632, as illustrated. Thus, photodetector 662 can be integrated on a common substrate of photonics IC 620.

In one embodiment, photodetector 638 conveys the received signal to TIA (transimpedance amplifier) 660 to convert and amplify the optical signal into a digital signal. Autocorrelator 670 represents autocorrelation logic or circuitry for system 600. In one embodiment, autocorrelator 670 is part of a processor or signal processor associated with photonic IC 620. In one embodiment, autocorrelator 670 includes digital autocorrelation logic or circuitry, to apply digital signal processing techniques to compare the bit pattern of the received signal to the bit pattern generated by code generator 614. In one embodiment, autocorrelator 670 includes analog autocorrelation logic or circuitry to combine the received signal with the generated bit pattern to determine how long the signal took to return. With either digital or analog autocorrelation, system 600 can determine how long reflection 644 took to return, which can indicate how far away the target is.

In one embodiment of system 600, as illustrated by the dashed "Alternative" circuitry, system 600 includes an off-chip photodetector. Thus, system 600 can be implemented as a single-chip design with photodetector 662 integrated on photonic IC 620, which noise reduction as light comes in through only a single lens to a single photonics IC. Alternatively, system 600 can be implemented as a two-chip design, which provides more light to the detector, but with more ambient light. In the alternative design, lens 680 of a different IC (i.e., different from photonic IC 620) receives reflection 644. In one embodiment, high bandwidth photodetector 682 receives reflection 644 and sends the reflection to TIA 684. TIA 684 can amplify the received optical signals and pass them to autocorrelator 670.

Figure 7:
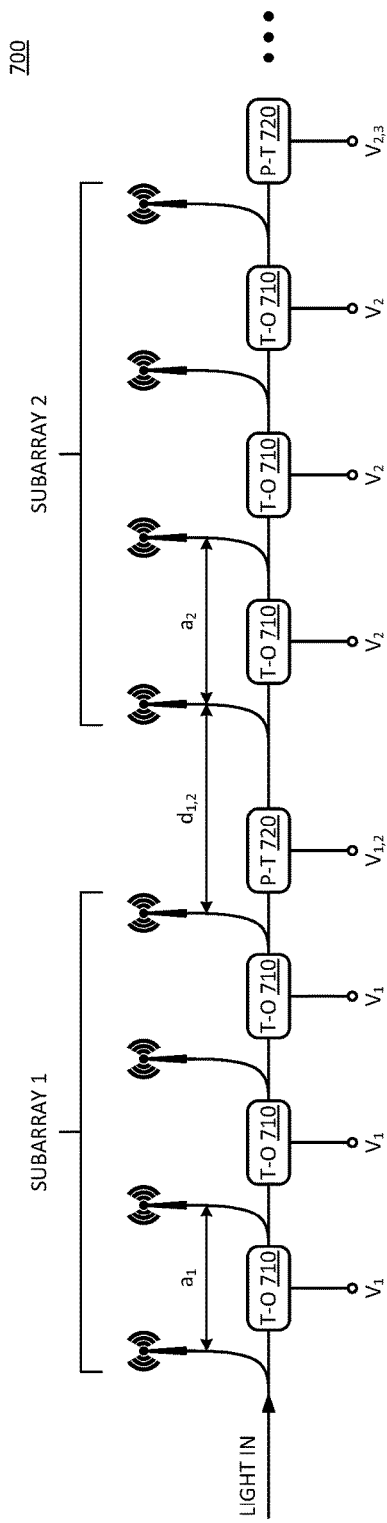
FIG. 7 is a representation of an embodiment of an antenna system with quasi-periodic spacing between antenna elements and between subarrays.

FIG. 7 is a representation of an embodiment of an antenna system with quasi-periodic spacing between antenna elements and between subarrays. System 700 provides one example of a system in accordance with system 300 and system 400. A quasi-periodic phased array can simplify the control circuit and phase alignment algorithm of a photonic system by using a significantly reduced number of control signals.

In one embodiment, system 700 represents an aperiodic or a quasi-periodic optical phased array with a serial-feeding architecture. A serial-feeding architecture refers to a system in which an optical circuit couples an optical signal into a bus waveguide or waveguide array, and the circuit includes couplers to tap off the optical signal into various antennas. In one embodiment, system 700 includes thermo-optic (T-O) phase tuners between tap couplers. Thermo-optic phase tuners 710 can control the phase of light for the next antenna.

In one embodiment, system 700 provides linear phase distribution along the antennas with respect to the position of the antenna. Such linear phase distribution can enable steering the optical beam. In one embodiment, antennas in each subarray are equally spaced, which enables the system to apply the same voltage to drive the phase tuners T-O 710 within the subarray (e.g. V1 in subarray 1) to create a linear phase change. In one embodiment, such a design would apply 2N−1 phase tuning signals for a phased array with N subarrays. In the example system configuration used to generate the data of FIG. 5, there were 7 subarrays (or N=7), which would require 13 phase tuning signals in system 700. The need for 13 phase tuning signals is much less than conventional periodic or random array for the same array size. In a conventional system, each antenna requires a separate tuning signal, for 133 signals in total. Thus, system 700 can provide a significantly simplified control circuit and phase aligning algorithm for a phased array.

In one embodiment, phase tuners 720 represent different types of phase tuners between subarrays as compared to the T-O phase tuners 710, which are phase tuners in the subarrays. As illustrated in system 700, the voltage for subarray 1 is $V_1$ and the voltage for subarray 2 is $V_2$. The voltage between subarray 1 and subarray 2 is $V_{1,2}$, and between subarray 2 and subarray 3 is $V_{2,3}$. The distance between antennas in subarray 1 is $a_1$, and the distance between antennas is subarray 2 is $a_2$. The distance between subarrays 1 and 2 is $d_{1,2}$.

Figure 8:
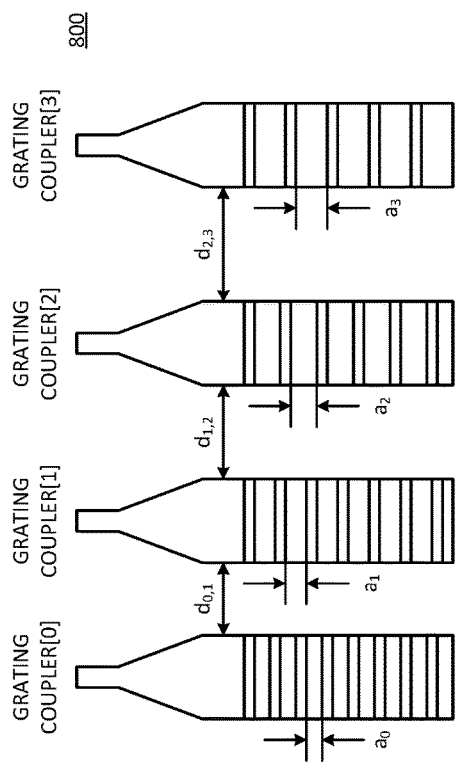
FIG. 8 is a representation of an embodiment of grating couplers as an antenna system with quasi-periodic spacing between antenna elements and between subarrays.

FIG. 8 is a representation of an embodiment of grating couplers as an antenna system with quasi-periodic spacing between antenna elements and between subarrays. System 800 represents one example of a phased emitter array in accordance with any of, or a combination of, system 300 of FIG. 3, system 400 of FIG. 4, or system 700 of FIG. 7. System 800 more specifically illustrates four grating couplers for optical transmission. While four grating couplers are illustrated, it will be understood that the same principles can apply to a system with more or fewer grating couplers.

Grating couplers [0:3] (or simply Couplers[0:3] for simplicity) represent one embodiment of optical emitters. Other types of optical emitters are possible. In one embodiment, the various Couplers[3:0] have associated emitter spacing or period $a_{[0:4]}$, respectively. System 800 also have spacing between the couplers, with a spacing of $d_{0,1}$ between Coupler[0] and Coupler[1], $d_{1,2}$ between Coupler[1] and Coupler[2], and $d_{2,3}$ between Coupler[2] and Coupler[3]. In one embodiment, all spacings are different from each other. In one embodiment, at least two of the spacings are the same.

Figure 9:
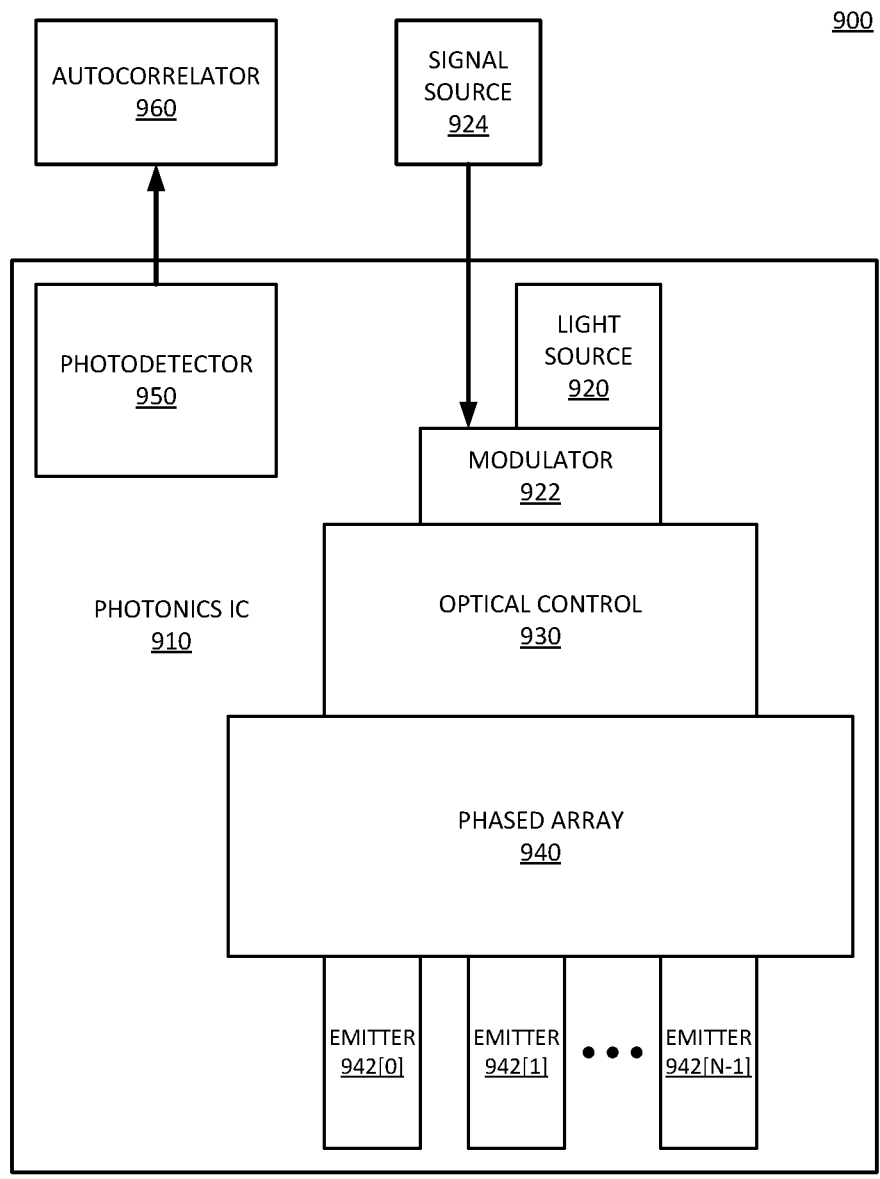
FIG. 9 is a block diagram of an embodiment of a system with an integrated solid state LIDAR circuit with quasi-periodically spaced emitter subarrays.

FIG. 9 is a block diagram of an embodiment of a system with an integrated solid state LIDAR circuit with quasi-periodically spaced emitter subarrays. System 900 provides one example of a LIDAR system with an emitter array with non-periodic spacings in accordance with an embodiment of system 300, system 400, system 700, or system 800. System 900 is illustrated in a format that might approximate an embodiment of an optical chip based on silicon photonics. It will be understood that components are not necessarily shown to scale, or shown in a practical layout. The illustration of system 900 is to provide one example of a LIDAR as described herein, without necessarily illustrating layout details.

Photonics IC (integrated circuit) 910 represents a chip and/or circuit board on which photonics components are disposed. At a silicon-processing level, each component disposed on photonics IC 910 can be integrated via optical processing techniques to create active components (such as drivers, lasers, processors, amplifiers, and other components) and passive components (such as waveguides, mirrors, gratings, couplers, and other components). Other components are possible. At another level, photonics IC 910 may be a system on a chip (SoC) substrate, with one or more components integrated directly onto the substrate, and one or more components disposed as separate ICs onto the SoC. At a circuit board level, photonics IC 910 can be a PCB (printed circuit board) onto which discrete components (such as a laser and a coupler) are disposed in addition to a core LIDAR engine IC enabled to generate a steerable light source.

In one embodiment, photonics IC 910 includes light source 920, which can be an on-chip or off-chip laser. Light source 920 passes an optical signal through modulator 922, which modulates a signal onto the optical carrier. Modulator 922 can be a high speed modulator. In one embodiment, modulator 922 can be a Mach-Zehnder modulator using either carrier depletion, carrier injection, or an applied electrical field to apply phase tuning to the two arms of an interferometer, thus creating constructive and destructive interference between the optical beams propagating in the two arms to induce amplitude modulation. In another embodiment, modulator 922 can be an electro-absorption modulator using carrier injection, carrier depletion, or an applied electrical field to cause absorption of the optical beam and thus induce amplitude modulation. In one embodiment, modulator 922 can be embodied in a silicon layer of system 900. In one embodiment where system 900 includes III-V material, modulator 922 can be integrated into the III-V material or both in silicon and III-V. The modulated signal can enable system 900 to autocorrelate reflection signals to perform depth detection of an object or environment. In one embodiment, signal source 924 represents a source of a bit pattern signal to be modulated onto the optical signal. In one embodiment, signal source 924 can be integrated onto photonics IC 910, and alternatively can be located off-chip.

In one embodiment, modulator 922 passes the modulated optical signal to optical control 930. Optical control 930 represents elements within photonics IC 910 to can amplify, couple, select, or a combination, or otherwise direct optical power via a waveguide to the phased array for phase control. Phased array 940 represents components on photonics IC 910 to apply variable phase control to separated optical signals to enable beamsteering by photonics IC 910. Thus, photonics IC 910 combines optical signal modulation with a LIDAR engine that generates steerable light. Photonics IC 910 includes an emitter array represented by emitters 942 [0:N−1], which can collectively be referred to as emitters 942, and an individual emitter can be identified as emitter 942 which can apply to any emitter 942[0:N−1]. Emitters 942 represent grating couplers or other couplers that emit light off-chip from the on-chip waveguides of phased array 940.

The emitter array represented by emitters 942 represents an emitter array in accordance with any embodiment described herein applicable to an optical system. Emitter 942 represent subarrays with multiple emitters each, separated by emitter spacing. The emitter subarrays are separated by subarray spacing. The spacing of the emitters or the subarrays or a combination causes constructive interference of a main beam or main lobe, and the non-constructive interference of aliasing beams.

For detection and ranging, system 900 captures the reflections or echoes of optical signals emitted by emitters 942. In one embodiment, system 900 includes PD (photodetector) 950, which represents a detector integrated with the LIDAR engine circuit. It will be understood that PD 950 can be on a separate chip from the beamsteering optics. In one embodiment, PD 950 receives light from a reverse path of waveguides used to transmit the optical beam from emitters 942. In one embodiment, PD 950 has a separate received light path, which can include a separate lens.

PD 950 can be or include a high bandwidth photodiode and one or more amplifier circuits. In one embodiment, PD 950 passes received light to autocorrelator 960 or other signal processing logic, or a combination. In one embodiment, autocorrelator 960 is off-chip from photonics IC 910. In one embodiment, autocorrelator 960 is part of a processor or controller that performs signal processing to determine depth information based on the received reflection and on the known bit sequence modulated onto the optical signal.

Figure 10:
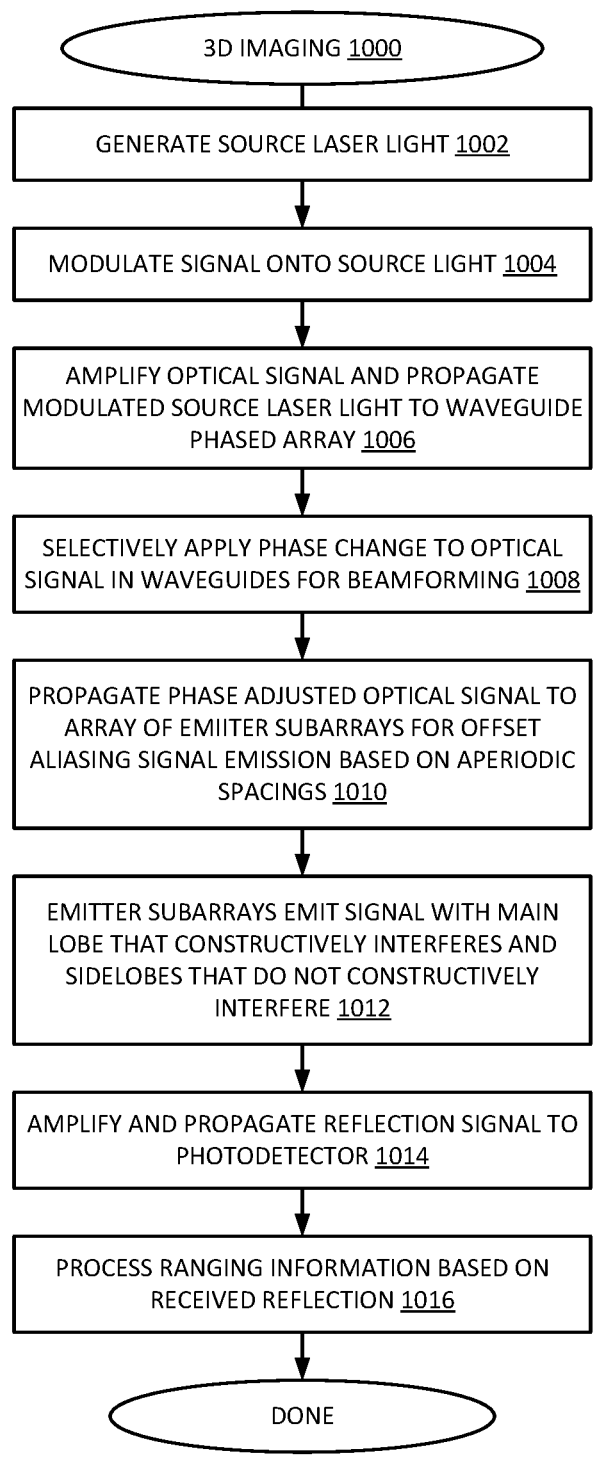
FIG. 10 is a flow diagram of an embodiment of a process for imaging with a solid state LIDAR circuit.

FIG. 10 is a flow diagram of an embodiment of a process for imaging with a solid state LIDAR circuit. An embodiment of process 1000 for 3D imaging can be executed by a solid state LIDAR engine in accordance with an embodiment described herein. An embodiment of process 1000 for 3D imaging can apply instead to emitting a signal from an array of non-periodically spaced subarrays of emitters in accordance with an embodiment described herein, which can be for purposes other than imaging.

In one embodiment, a LIDAR system generates a source laser light signal, 1002. In one embodiment, the laser is a laser integrated on the same LIDAR engine circuit that includes a phased waveguide array and beamsteering circuitry. In one embodiment, the LIDAR system includes a modulator to modulate a bit pattern into the source light, 1004. In one embodiment, the LIDAR system amplifies the optical signal and propagates the modulated source laser light to multiple waveguides of a phased array, 1006. The propagation to the phased array can include the use of couples, multiplexer/demultiplexer, splitter, and/or other components. The phased array can include any type of phase control that can be integrated into a LIDAR circuit, such as those described herein. In one embodiment, the LIDAR system selectively applies a phase change to the optical signals in the waveguides, 1008. The application of the phase change can beamsteer the optical signal. Other beamsteering operations can also or alternatively be performed.

In one embodiment, the waveguides propagate the phase adjusted optical signal to an array of emitter subarrays in accordance with any embodiment of a phased array described herein. The emission of signals with the emitter subarrays provides offset aliasing signal emission based on quasi-periodic spacings, 1010. The quasi-periodic spacing refers to different spacing between subarrays from one emitter subarray to another. In one embodiment, the emitter spacing within a subarray are periodic. In one embodiment, the emitter spacing within a subarray are periodic and the periods are different from one subarray to another. It will be understood that the difference in spacings can be computed to cause constructive interference of the main lobe, while suppressing the sidelobes by ensuring they do not constructively interfere or add.

In one embodiment, the LIDAR system receives reflection signals and amplifies and passes the received light to a photodetector, 10014. In one embodiment, the photodetector passes a signal to a processor to process ranging information based on the received reflection, 1016. In one embodiment, the processing can include performing operations with an autocorrelation circuit to autocorrelate the reflection signal with a known transmission signal pattern, such as a pseudorandom bit sequence. Autocorrelation can provide much higher precision to ranging determinations, resulting in a high precision LIDAR that does not require a high power output signal. The processing can include signal processing to generate a 3D image or mapping of the target.

Figure 11:
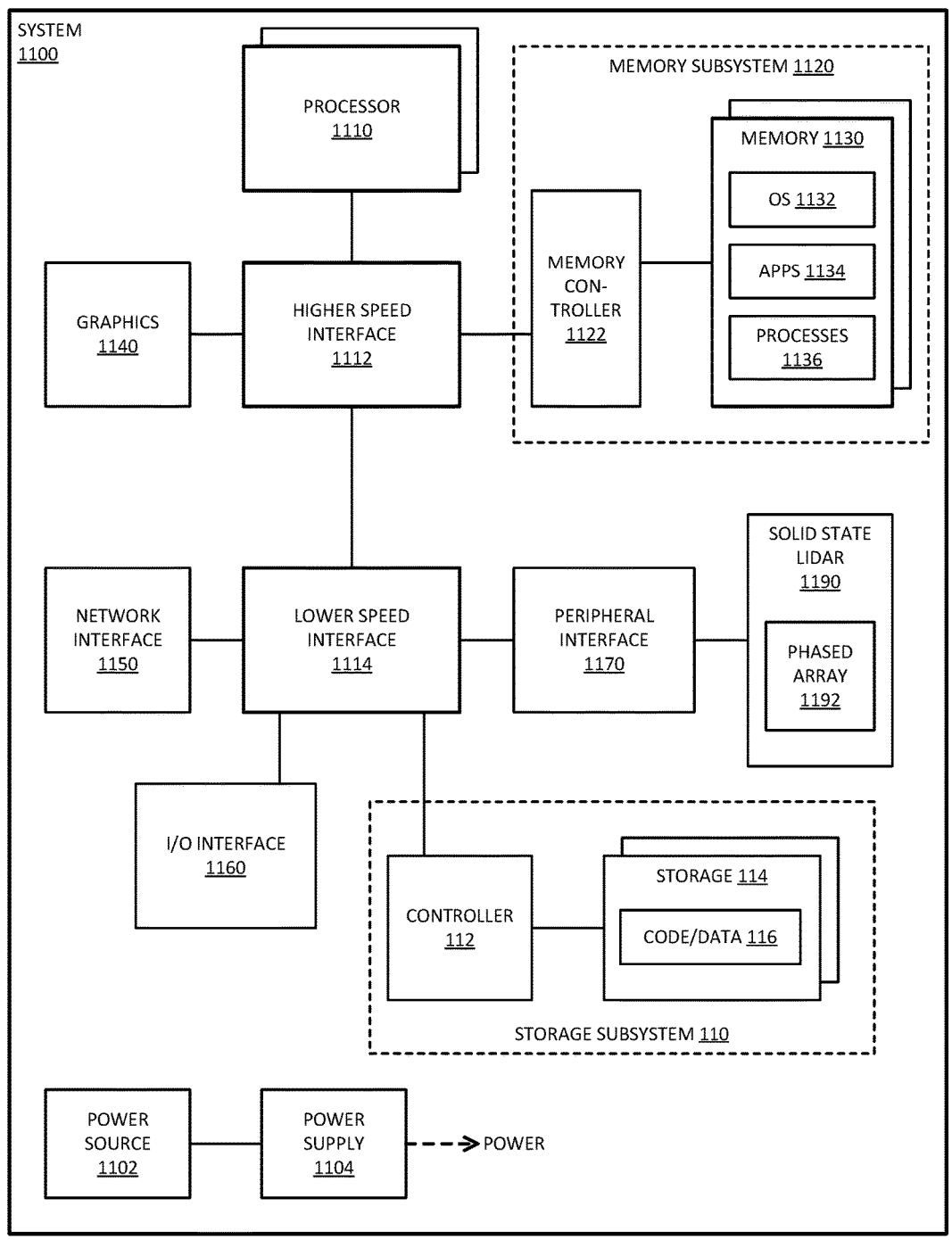
FIG. 11 is a block diagram of an embodiment of a computing system in which a low power, high resolution solid state LIDAR circuit can be implemented.

FIG. 11 is a block diagram of an embodiment of a computing system in which a low power, high resolution solid state LIDAR circuit can be implemented. System 1100 represents a computing device in accordance with any embodiment described herein, and can be a laptop computer, a desktop computer, a tablet computer, a server, a gaming or entertainment control system, a scanner, copier, printer, routing or switching device, embedded computing device, a smartphone, a wearable device, an internet-of-things device or other electronic device.

System 1100 includes processor 1110, which provides processing, operation management, and execution of instructions for system 1100. Processor 1110 can include any type of microprocessor, central processing unit (CPU), graphics processing unit (GPU), processing core, or other processing hardware to provide processing for system 1100, or a combination of processors. Processor 1110 controls the overall operation of system 1100, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one embodiment, system 1100 includes interface 1112 coupled to processor 1110, which can represent a higher speed interface or a high throughput interface for system components that needs higher bandwidth connections, such as memory subsystem 1120 or graphics interface components 1140. Interface 1112 can represent a "north bridge" circuit, which can be a standalone component or integrated onto a processor die. Where present, graphics interface 1140 interfaces to graphics components for providing a visual display to a user of system 1100. In one embodiment, graphics interface 1140 can drive a high definition (HD) display that provides an output to a user. High definition can refer to a display having a pixel density of approximately 100 PPI (pixels per inch) or greater, and can include formats such as full HD (e.g., 1080p), retina displays, 4K (ultra high definition or UHD), or others. In one embodiment, the display can include a touchscreen display. In one embodiment, graphics interface 1140 generates a display based on data stored in memory 1130 or based on operations executed by processor 1110 or both. In one embodiment, graphics interface 1140 generates a display based on data stored in memory 1130 or based on operations executed by processor 1110 or both.

Memory subsystem 1120 represents the main memory of system 1100, and provides storage for code to be executed by processor 1110, or data values to be used in executing a routine. Memory subsystem 1120 can include one or more memory devices 1130 such as read-only memory (ROM), flash memory, one or more varieties of random access memory (RAM) such as DRAM, or other memory devices, or a combination of such devices. Memory 1130 stores and hosts, among other things, operating system (OS) 1132 to provide a software platform for execution of instructions in system 1100. Additionally, applications 1134 can execute on the software platform of OS 1132 from memory 1130. Applications 1134 represent programs that have their own operational logic to perform execution of one or more functions. Processes 1136 represent agents or routines that provide auxiliary functions to OS 1132 or one or more applications 1134 or a combination. OS 1132, applications 1134, and processes 1136 provide software logic to provide functions for system 1100. In one embodiment, memory subsystem 1120 includes memory controller 1122, which is a memory controller to generate and issue commands to memory 1130. It will be understood that memory controller 1122 could be a physical part of processor 1110 or a physical part of interface 1112. For example, memory controller 1122 can be an integrated memory controller, integrated onto a circuit with processor 1110.

While not specifically illustrated, it will be understood that system 1100 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire").

In one embodiment, system 1100 includes interface 1114, which can be coupled to interface 1112. Interface 1114 can be a lower speed interface than interface 1112. In one embodiment, interface 1114 can be a "south bridge" circuit, which can include standalone components and integrated circuitry. In one embodiment, multiple user interface components or peripheral components, or both, couple to interface 1114. Network interface 1150 provides system 1100 the ability to communicate with remote devices (e.g., servers or other computing devices) over one or more networks. Network interface 1150 can include an Ethernet adapter, wireless interconnection components, cellular network interconnection components, USB (universal serial bus), or other wired or wireless standards-based or proprietary interfaces. Network interface 1150 can exchange data with a remote device, which can include sending data stored in memory or receiving data to be stored in memory.

In one embodiment, system 1100 includes one or more input/output (I/O) interface(s) 1160. I/O interface 1160 can include one or more interface components through which a user interacts with system 1100 (e.g., audio, alphanumeric, tactile/touch, or other interfacing). Peripheral interface 1170 can include any hardware interface not specifically mentioned above. Peripherals refer generally to devices that connect dependently to system 1100. A dependent connection is one where system 1100 provides the software platform or hardware platform or both on which operation executes, and with which a user interacts.

In one embodiment, system 1100 includes storage subsystem 1180 to store data in a nonvolatile manner. In one embodiment, in certain system implementations, at least certain components of storage 1180 can overlap with components of memory subsystem 1120. Storage subsystem 1180 includes storage device(s) 1184, which can be or include any conventional medium for storing large amounts of data in a nonvolatile manner, such as one or more magnetic, solid state, or optical based disks, or a combination. Storage 1184 holds code or instructions and data 1186 in a persistent state (i.e., the value is retained despite interruption of power to system 1100). Storage 1184 can be generically considered to be a "memory," although memory 1130 is typically the executing or operating memory to provide instructions to processor 1110. Whereas storage 1184 is nonvolatile, memory 1130 can include volatile memory (i.e., the value or state of the data is indeterminate if power is interrupted to system 1100). In one embodiment, storage subsystem 1180 includes controller 1182 to interface with storage 1184. In one embodiment controller 1182 is a physical part of interface 1114 or processor 1110, or can include circuits or logic in both processor 1110 and interface 1114.

Power source 1102 provides power to the components of system 1100. More specifically, power source 1102 typically interfaces to one or multiple power supplies 1104 in system 1102 to provide power to the components of system 1100. In one embodiment, power supply 1104 includes an AC to DC (alternating current to direct current) adapter to plug into a wall outlet. Such AC power can be renewable energy (e.g., solar power) power source 1102. In one embodiment, power source 1102 includes a DC power source, such as an external AC to DC converter. In one embodiment, power source 1102 or power supply 1104 includes wireless charging hardware to charge via proximity to a charging field. In one embodiment, power source 1102 can include an internal battery or fuel cell source.

In one embodiment, system 1100 includes solid state LIDAR 1190 with phased array 1192 that has non-periodic spacings in accordance with any embodiment described herein. LIDAR 1190 can be connected in system 1100 as a peripheral device, and can provide ranging and detection services. LIDAR 1190 can perform gesture recognition or other interface sensing. Phased array 1192 enables LIDAR 1190 to emit signals having high SNR with good resolution over a large angle of detection. Phased array 1192 includes non-periodic spacing between subarrays of emitters. The non-periodic spacing causes the main lobes to constructively add, while suppressing the aliasing sidelobe signals. Phased array 1192 includes multiple subarrays with multiple emitters each, separated by emitter spacing. The emitter subarrays are separated by subarray spacing. The spacing of the emitters or the subarrays or a combination causes constructive interference of a main beam or main lobe, and the non-constructive interference of aliasing beams.

Figure 12:
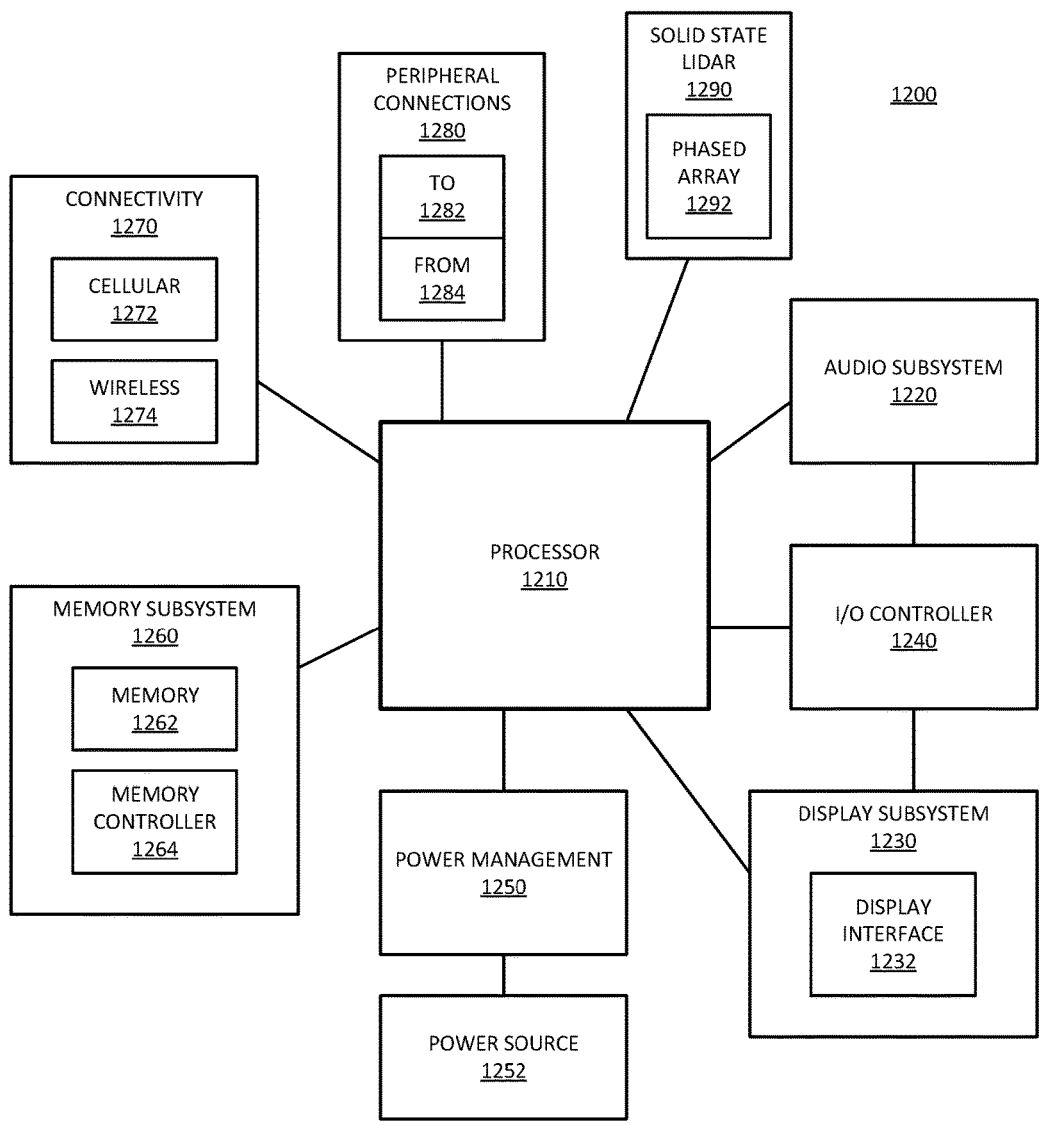
FIG. 12 is a block diagram of an embodiment of a mobile device in which a low power, high resolution solid state LIDAR circuit can be implemented.

FIG. 12 is a block diagram of an embodiment of a mobile device in which a low power, high resolution solid state LIDAR circuit can be implemented. Device 1200 represents a mobile computing device, such as a computing tablet, a mobile phone or smartphone, a wireless-enabled e-reader, wearable computing device, an internet-of-things device or other mobile device, or an embedded computing device. It will be understood that certain of the components are shown generally, and not all components of such a device are shown in device 1200.

Device 1200 includes processor 1210, which performs the primary processing operations of device 1200. Processor 1210 can include one or more physical devices, such as microprocessors, application processors, microcontrollers, programmable logic devices, or other processing means. The processing operations performed by processor 1210 include the execution of an operating platform or operating system on which applications and device functions are executed. The processing operations include operations related to I/O (input/output) with a human user or with other devices, operations related to power management, operations related to connecting device 1200 to another device, or a combination. The processing operations can also include operations related to audio I/O, display I/O, or other interfacing, or a combination. Processor 1210 can execute data stored in memory. Processor 1210 can write or edit data stored in memory.

In one embodiment, system 1200 includes one or more sensors 1212. Sensors 1212 represent embedded sensors or interfaces to external sensors, or a combination. Sensors 1212 enable system 1200 to monitor or detect one or more conditions of an environment or a device in which system 1200 is implemented. Sensors 1212 can include environmental sensors (such as temperature sensors, motion detectors, light detectors, cameras, chemical sensors (e.g., carbon monoxide, carbon dioxide, or other chemical sensors)), pressure sensors, accelerometers, gyroscopes, medical or physiology sensors (e.g., biosensors, heart rate monitors, or other sensors to detect physiological attributes), or other sensors, or a combination. Sensors 1212 can also include sensors for biometric systems such as fingerprint recognition systems, face detection or recognition systems, or other systems that detect or recognize user features. Sensors 1212 should be understood broadly, and not limiting on the many different types of sensors that could be implemented with system 1200. In one embodiment, one or more sensors 1212 couples to processor 1210 via a frontend circuit integrated with processor 1210. In one embodiment, one or more sensors 1212 couples to processor 1210 via another component of system 1200.

In one embodiment, device 1200 includes audio subsystem 1220, which represents hardware (e.g., audio hardware and audio circuits) and software (e.g., drivers, codecs) components associated with providing audio functions to the computing device. Audio functions can include speaker or headphone output, as well as microphone input. Devices for such functions can be integrated into device 1200, or connected to device 1200. In one embodiment, a user interacts with device 1200 by providing audio commands that are received and processed by processor 1210.

Display subsystem 1230 represents hardware (e.g., display devices) and software components (e.g., drivers) that provide a visual display for presentation to a user. In one embodiment, the display includes tactile components or touchscreen elements for a user to interact with the computing device. Display subsystem 1230 includes display interface 1232, which includes the particular screen or hardware device used to provide a display to a user. In one embodiment, display interface 1232 includes logic separate from processor 1210 (such as a graphics processor) to perform at least some processing related to the display. In one embodiment, display subsystem 1230 includes a touch-screen device that provides both output and input to a user. In one embodiment, display subsystem 1230 includes a high definition (HD) display that provides an output to a user. High definition can refer to a display having a pixel density of approximately 100 PPI (pixels per inch) or greater, and can include formats such as full HD (e.g., 1080p), retina displays, 4K (ultra high definition or UHD), or others. In one embodiment, display subsystem includes a touchscreen display. In one embodiment, display subsystem 1230 generates display information based on data stored in memory or based on operations executed by processor 1210 or both.

I/O controller 1240 represents hardware devices and software components related to interaction with a user. I/O controller 1240 can operate to manage hardware that is part of audio subsystem 1220, or display subsystem 1230, or both. Additionally, I/O controller 1240 illustrates a connection point for additional devices that connect to device 1200 through which a user might interact with the system. For example, devices that can be attached to device 1200 might include microphone devices, speaker or stereo systems, video systems or other display device, keyboard or keypad devices, or other I/O devices for use with specific applications such as card readers or other devices.

As mentioned above, I/O controller 1240 can interact with audio subsystem 1220 or display subsystem 1230 or both. For example, input through a microphone or other audio device can provide input or commands for one or more applications or functions of device 1200. Additionally, audio output can be provided instead of or in addition to display output. In another example, if display subsystem includes a touchscreen, the display device also acts as an input device, which can be at least partially managed by I/O controller 1240. There can also be additional buttons or switches on device 1200 to provide I/O functions managed by I/O controller 1240.

In one embodiment, I/O controller 1240 manages devices such as accelerometers, cameras, light sensors or other environmental sensors, gyroscopes, global positioning system (GPS), or other hardware that can be included in device 1200, or sensors 1212. The input can be part of direct user interaction, as well as providing environmental input to the system to influence its operations (such as filtering for noise, adjusting displays for brightness detection, applying a flash for a camera, or other features).

In one embodiment, device 1200 includes power management 1250 that manages battery power usage, charging of the battery, and features related to power saving operation. Power management 1250 manages power from power source 1252, which provides power to the components of system 1200. In one embodiment, power source 1252 includes an AC to DC (alternating current to direct current) adapter to plug into a wall outlet. Such AC power can be renewable energy (e.g., solar power, motion based power). In one embodiment, power source 1252 includes only DC power, which can be provided by a DC power source, such as an external AC to DC converter. In one embodiment, power source 1252 includes wireless charging hardware to charge via proximity to a charging field. In one embodiment, power source 1252 can include an internal battery or fuel cell source.

Memory subsystem 1260 includes memory device(s) 1262 for storing information in device 1200. Memory subsystem 1260 can include nonvolatile (state does not change if power to the memory device is interrupted) or volatile (state is indeterminate if power to the memory device is interrupted) memory devices, or a combination. Memory 1260 can store application data, user data, music, photos, documents, or other data, as well as system data (whether long-term or temporary) related to the execution of the applications and functions of system 1200. In one embodiment, memory subsystem 1260 includes memory controller 1264 (which could also be considered part of the control of system 1200, and could potentially be considered part of processor 1210). Memory controller 1264 includes a scheduler to generate and issue commands to control access to memory device 1262.

Connectivity 1270 includes hardware devices (e.g., wireless or wired connectors and communication hardware, or a combination of wired and wireless hardware) and software components (e.g., drivers, protocol stacks) to enable device 1200 to communicate with external devices. The external device could be separate devices, such as other computing devices, wireless access points or base stations, as well as peripherals such as headsets, printers, or other devices. In one embodiment, system 1200 exchanges data with an external device for storage in memory or for display on a display device. The exchanged data can include data to be stored in memory, or data already stored in memory, to read, write, or edit data.

Connectivity 1270 can include multiple different types of connectivity. To generalize, device 1200 is illustrated with cellular connectivity 1272 and wireless connectivity 1274. Cellular connectivity 1272 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 1274 refers to wireless connectivity that is not cellular, and can include personal area networks (such as Bluetooth), local area networks (such as WiFi), or wide area networks (such as WiMax), or other wireless communication, or a combination. Wireless communication refers to transfer of data through the use of modulated electromagnetic radiation through a non-solid medium. Wired communication occurs through a solid communication medium.

Peripheral connections 1280 include hardware interfaces and connectors, as well as software components (e.g., drivers, protocol stacks) to make peripheral connections. It will be understood that device 1200 could both be a peripheral device ("to" 1282) to other computing devices, as well as have peripheral devices ("from" 1284) connected to it. Device 1200 commonly has a "docking" connector to connect to other computing devices for purposes such as managing (e.g., downloading, uploading, changing, synchronizing) content on device 1200. Additionally, a docking connector can allow device 1200 to connect to certain peripherals that allow device 1200 to control content output, for example, to audiovisual or other systems.

In addition to a proprietary docking connector or other proprietary connection hardware, device 1200 can make peripheral connections 1280 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

In one embodiment, system 1200 includes solid state LIDAR 1290 with phased array 1292 that has non-periodic spacings in accordance with any embodiment described herein. LIDAR 1290 can be connected in system 1200 as a peripheral device, and can provide ranging and detection services. LIDAR 1290 can perform gesture recognition or other interface sensing. Phased array 1292 enables LIDAR 1290 to emit signals having high SNR with good resolution over a large angle of detection. Phased array 1292 includes non-periodic spacing between subarrays of emitters. The non-periodic spacing causes the main lobes to constructively add, while suppressing the aliasing sidelobe signals. Phased array 1292 includes multiple subarrays with multiple emitters each, separated by emitter spacing. The emitter subarrays are separated by subarray spacing. The spacing of the emitters or the subarrays or a combination causes constructive interference of a main beam or main lobe, and the non-constructive interference of aliasing beams.

In one aspect, a transmission circuit includes: a signal generation circuit to provide a source signal; a first subarray of emitters coupled to the signal generation circuit, to emit the signal from the transmission circuit; and a second subarray of emitters coupled to the signal generation circuit, to emit the signal from the transmission circuit; wherein the first and second subarrays are separated by a subarray spacing, and wherein the subarray spacing is quasi-periodic, with different spacing between subarrays to cause constructive interference of a main lobe of the emissions from the first subarray and the second subarray, and to cause non-constructive interference of sidelobes of the emissions from the first subarray and the second subarray.

In one embodiment, the subarray spacing comprises a first subarray spacing, and further comprising: a third subarray of emitters coupled to the signal generation circuit, to emit the signal from the transmission circuit; wherein the second and third subarrays are separated by a second subarray spacing different than the first subarray spacing. In one embodiment, the second subarray spacing is greater than the first subarray spacing. In one embodiment, the first subarray having first emitter spacing between emitters of the first subarray; and, wherein the second subarray having second emitter spacing between emitters of the second subarray, wherein the first emitter spacing is different than the second emitter spacing. In one embodiment, the second emitter spacing is greater than the first emitter spacing. In one embodiment, the sidelobes of the emissions of the first subarray and second subarray do not experience constructive interference based on a combination of the quasi-periodic subarray spacing, the first emitter spacing, and the second emitter spacing. In one embodiment, the subarray spacing comprises a first subarray spacing, and further comprising: a third subarray of emitters coupled to the signal generation circuit, to emit the signal from the transmission circuit, the third subarray of emitters having a third emitter spacing different from the first emitter spacing and the second emitter spacing; wherein the second and third subarrays are separated by a second subarray spacing different than the first subarray spacing. In one embodiment, the transmission circuit comprises an optical transmission circuit, and the first subarray of emitters and the second subarray of emitters comprise optical emitters. In one embodiment, the emitters comprise grating couplers. In one embodiment, further comprising a phased array of waveguides to convey an optical signal from the signal generation circuit to the optical emitters. In one embodiment, the phased array of waveguides is to electrically cause phase offsets in the waveguides to beamsteer the optical signal emission from the emitters.

In one aspect, an apparatus to transmit a wireless signal includes: a photonic integrated circuit (I/C) including a signal generation circuit to provide an optical signal; and multiple emitter subarrays coupled to the signal generation circuit, to emit the optical signal from the photonic I/C, the subarrays separated by subarray spacing that is not periodic from one subarray to another, with at least two different subarrays spacings between adjacent subarrays; wherein the subarray spacing is quasi-periodic, with different spacing between subarrays to cause constructive interference of a main lobe of the emissions from the multiple subarrays, and to cause non-constructive interference of sidelobes of the emissions from the multiple subarrays; and a photodetector to receive a reflection signal in response to emission of the optical signal from the multiple subarrays.

In one embodiment, the subarray spacing comprises a first subarray spacing, and further comprising: a third subarray of emitters coupled to the signal generation circuit, to emit the signal from the transmission circuit; wherein the second and third subarrays are separated by a second subarray spacing different than the first subarray spacing. In one embodiment, the second subarray spacing is greater than the first subarray spacing. In one embodiment, the first subarray having first emitter spacing between emitters of the first subarray; and, wherein the second subarray having second emitter spacing between emitters of the second subarray, wherein the first emitter spacing is different than the second emitter spacing. In one embodiment, the second emitter spacing is greater than the first emitter spacing. In one embodiment, the sidelobes of the emissions of the first subarray and second subarray do not experience constructive interference based on a combination of the quasi-periodic subarray spacing, the first emitter spacing, and the second emitter spacing. In one embodiment, the subarray spacing comprises a first subarray spacing, and further comprising: a third subarray of emitters coupled to the signal generation circuit, to emit the signal from the transmission circuit, the third subarray of emitters having a third emitter spacing different from the first emitter spacing and the second emitter spacing; wherein the second and third subarrays are separated by a second subarray spacing different than the first subarray spacing. In one embodiment, the transmission circuit comprises an optical transmission circuit, and the first subarray of emitters and the second subarray of emitters comprise optical emitters. In one embodiment, the emitters comprise grating couplers. In one embodiment, further comprising a phased array of waveguides to convey an optical signal from the signal generation circuit to the optical emitters. In one embodiment, the phased array of waveguides is to electrically cause phase offsets in the waveguides to beamsteer the optical signal emission from the emitters.

In one aspect, a method for transmitting a wireless signal, comprising: receiving a source signal; emitting the signal from a first subarray of emitters; and emitting the signal from a second subarray of emitters; wherein the first and second subarrays are separated by a subarray spacing, and wherein the subarray spacing is quasi-periodic, with different spacing between subarrays to cause constructive interference of a main lobe of the emissions from the first subarray and the second subarray, and to cause non-constructive interference of sidelobes of the emissions from the first subarray and the second subarray.

In one embodiment, the subarray spacing comprises a first subarray spacing, and further comprising: emitting the signal from a third subarray of emitters, wherein the second and third subarrays are separated by a second subarray spacing different than the first subarray spacing. In one embodiment, the second subarray spacing is greater than the first subarray spacing. In one embodiment, the first subarray having first emitter spacing between emitters of the first subarray; and, wherein the second subarray having second emitter spacing between emitters of the second subarray, wherein the first emitter spacing is different than the second emitter spacing. In one embodiment, the second emitter spacing is greater than the first emitter spacing. In one embodiment, the sidelobes of the emissions of the first subarray and second subarray do not experience constructive interference based on a combination of the quasi-periodic subarray spacing, the first emitter spacing, and the second emitter spacing. In one embodiment, the subarray spacing comprises a first subarray spacing, and further comprising: emitting the signal from a third subarray of emitters, the third subarray of emitters having a third emitter spacing different from the first emitter spacing and the second emitter spacing; wherein the second and third subarrays are separated by a second subarray spacing different than the first subarray spacing. In one embodiment, receiving the source signal comprises receiving an optical signal, and the first subarray of emitters and the second subarray of emitters comprise optical emitters. In one embodiment, the emitters comprise grating couplers. In one embodiment, further comprising a phased array of waveguides to convey an optical signal from the signal generation circuit to the optical emitters. In one embodiment, the phased array of waveguides is to electrically cause phase offsets in the waveguides to beamsteer the optical signal emission from the emitters.

In one aspect, an apparatus comprising means for performing operations to execute a method for transmitting a wireless signal in accordance with any embodiment set forth above. In one aspect, an article of manufacture comprising a computer readable storage medium having content stored thereon, which when executed provides instructions to cause a machine to perform operations to execute a method for transmitting a wireless signal in accordance with any embodiment set forth above.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Therefore, the illustrations and examples herein should be construed in an illustrative, and not a restrictive sense.

What is claimed is:

1. A transmission circuit, comprising:
   a signal generation circuit to provide a source signal;
   a first subarray of emitters coupled to the signal generation circuit, to emit the signal from the transmission circuit, the first subarray having at least three emitters with periodic emitter spacing, where any adjacent emitters of the first subarray have a same first emitter spacing;
   a second subarray of emitters coupled to the signal generation circuit, to emit the signal from the transmission circuit, the second subarray having at least three emitters with periodic emitter spacing, where any adjacent emitters of the second subarray have a same second emitter spacing, the second emitter spacing different from the first emitter spacing; and
   a third subarray of emitters coupled to the signal generation circuit, to emit the signal from the transmission circuit, the third subarray having at least three emitters with periodic emitter spacing, where any adjacent emitters of the third subarray have a same third emitter spacing, the third emitter spacing different from the first emitter spacing and the second emitter spacing;
   wherein the subarrays are separated by aperiodic spacing, with a first subarray spacing between the first and second subarrays that is different from a second subarray spacing between the second and third subarrays.

2. The transmission circuit of claim 1, wherein the transmission circuit comprises an optical transmission circuit, and the first subarray of emitters, the second subarray of emitters, and the third subarray of emitters comprise optical emitters.

3. The transmission circuit of claim 2, wherein the first, second, and third subarrays comprise grating couplers.

4. The transmission circuit of claim 2, further comprising a phased array of waveguides to convey an optical signal from the signal generation circuit to the optical emitters.

5. The transmission circuit of claim 4, wherein the phased array of waveguides is to electrically cause phase offsets in the waveguides responsive to application of control signal voltages to the phased array of waveguides to beamsteer the optical signal emission from the emitters.

6. The transmission circuit of claim 1, wherein the aperiodic spacing of the subarrays comprises spacing calculated based on a wavelength of the source signal, to cause constructive interface of a main lobe of emissions from the first, second, and third subarrays, and cause destructive interference of sidelobes of the emissions.

7. The transmission circuit of claim 6, wherein the second subarray spacing is greater than the first subarray spacing.

8. The transmission circuit of claim 6, wherein the second emitter spacing is greater than the first emitter spacing, and the third emitter spacing is greater than the second emitter spacing.

9. The transmission circuit of claim 1, further comprising:
   a first phase tuner between the first and second subarrays to control propagation of the source signal between the first and second subarrays.

10. The transmission circuit of claim 1, wherein the first, second, and third subarrays couple to each other in a serial feed architecture where the first subarray couples to the source generation circuit to receive the source signal, the second subarray couples to the source generation circuit via the first subarray, and the third subarray couples to the source generation circuit via the second subarray.

11. The transmission circuit of claim 1, wherein a largest emitter spacing of the subarrays is smaller than smallest subarray spacing between the subarrays.

12. An apparatus to transmit a wireless signal, comprising:
   a photonic integrated circuit (I/C) including
      a signal generation circuit to provide an optical signal;
      a first subarray of emitters coupled to the signal generation circuit, to emit the optical signal from the transmission circuit, the first subarray having at least three emitters with periodic emitter spacing, where any adjacent emitters of the first subarray have a same first emitter spacing;
      a second subarray of emitters coupled to the signal generation circuit, to emit the optical signal from the transmission circuit, the second subarray having at least three emitters with periodic emitter spacing, where any adjacent emitters of the second subarray have a same second emitter spacing, the second emitter spacing different from the first emitter spacing; and
      a third subarray of emitters coupled to the signal generation circuit, to emit the optical signal from the transmission circuit, the third subarray having at least three emitters with periodic emitter spacing, where any adjacent emitters of the third subarray have a same third emitter spacing, the third emitter spacing different from the first emitter spacing and the second emitter spacing;
      wherein the subarrays are separated by aperiodic spacing, with a first subarray spacing between the first and second subarrays that is different from a second subarray spacing between the second and third subarrays; and
   a photodetector to receive a reflection signal in response to emission of the optical signal from the multiple subarrays.

13. The apparatus of claim 12, wherein the emitters comprise grating couplers.

14. The apparatus of claim 12, further comprising a phased array of waveguides to convey an optical signal from the signal generation circuit to the emitters.

15. The apparatus of claim 14, wherein the phased array of waveguides is to electrically cause phase offsets in the waveguides responsive to application of control signal voltages to the phased array of waveguides to beamsteer the optical signal emission from the emitters.

16. The apparatus of claim 12, wherein the aperiodic spacing of the subarrays comprises spacing calculated based on a wavelength of the source signal, to cause constructive interface of a main lobe of emissions from the first, second, and third subarrays, and cause destructive interference of sidelobes of the emissions.

17. The apparatus of claim 16, wherein the second subarray spacing is greater than the first subarray spacing.

18. The apparatus of claim 16, wherein the second emitter spacing is greater than the first emitter spacing, and the third emitter spacing is greater than the second emitter spacing.

19. The apparatus of claim 12, wherein the first, second, and third subarrays couple to each other in a serial feed architecture where the first subarray couples to the source generation circuit to receive the source signal, the second subarray couples to the source generation circuit via the first subarray, and the third subarray couples to the source generation circuit via the second subarray.

20. The apparatus of claim 12, wherein a largest emitter spacing of the subarrays is smaller than smallest subarray spacing between the subarrays.

* * * * *